United States Patent
Yang

(10) Patent No.: US 6,496,390 B2
(45) Date of Patent: Dec. 17, 2002

(54) POWER SUPPLY WITH REDUCED POWER CONSUMPTION IN STANDBY MODE

(75) Inventor: Jun-Hyun Yang, Suwon (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/938,665

(22) Filed: Aug. 27, 2001

(65) Prior Publication Data

US 2002/0036910 A1 Mar. 28, 2002

(30) Foreign Application Priority Data

Sep. 22, 2000 (KR) .......................................... 00-55682

(51) Int. Cl.$^7$ ............................................. H02M 3/335
(52) U.S. Cl. ................................................... 363/21.07
(58) Field of Search ........................ 363/16, 20, 21.01, 363/21.04, 21.07, 49, 95, 97, 131

(56) References Cited

U.S. PATENT DOCUMENTS

| | | | |
|---|---|---|---|
| 4,734,771 A | * | 3/1988 | Lendaro et al. ............. 358/190 |
| 4,975,592 A | * | 12/1990 | Hahn et al. .................. 307/38 |
| 5,041,964 A | | 8/1991 | Cole et al. |
| 5,126,930 A | | 6/1992 | Ahn |
| 5,278,654 A | | 1/1994 | Yang |
| 5,351,177 A | | 9/1994 | Megeid |
| 5,375,247 A | | 12/1994 | Hueser |
| 5,812,383 A | | 9/1998 | Majid et al. |
| 5,920,466 A | | 7/1999 | Hirahara |
| 6,043,994 A | | 3/2000 | Keller |
| 6,151,224 A | | 11/2000 | Lim et al. |
| 6,157,549 A | | 12/2000 | Nath |
| 6,330,175 B2 | * | 12/2001 | Shirato et al. ............... 363/89 |

* cited by examiner

*Primary Examiner*—Matthew Nguyen
(74) *Attorney, Agent, or Firm*—Robert E. Bushnell, Esq.

(57) ABSTRACT

A power supply includes an operating power circuit outputting an operating voltage, a standby power circuit outputting a standby voltage, a starting switching circuit having a first remote control receiver for receiving a first remote control signal and supplying a starting power to the standby power circuit in response to the first remote control signal, a controller having a second remote control receiver for receiving a second remote control signal and performing a function corresponding to the second remote control signal, and a feedback circuit processing a control signal to switch the starting switching circuit to either of a standby mode and a power saving mode in response to a power off signal from either of the second remote control receiver and a power switch.

14 Claims, 4 Drawing Sheets

POWER SUPPLY WITH REDUCED POWER CONSUMPTION IN STANDBY MODE

CLAIM OF PRIORITY

This application makes reference to, incorporates the same herein, and claims all benefits accruing under 35 U.S.C. §119 from an application for CONSUMPTION POWER SAVING APPARATUS AND CONTROLLING METHOD IN A STAND-BY MODE earlier filed in the Korean Industrial Property Office on Sep. 22, 2000 and there duly assigned Serial No. 2000-55682.

BACKGROUND OF THE INVENTION

1. Field of the Invention

The present invention relates to a power supply having a standby mode, during which the electric power consumption is reduced.

2. Description of Related Art

Electronic appliances such as a television and a video cassette recorder (VCR) employ a switched-mode power supply (SMPS) as a power supply and include an operating mode and a standby mode in order to implement a high function, for example, a remote control function and a timer function. The operating mode is a mode in which the appliance being on, the power supply delivers the average power which is needed for the appliance to work properly. In the standby mode, the appliance is off, but only minimum function circuits such as a timer and a microprocessor are still powered. For example, a television goes to a standby mode when a main power is turned off, so that minimum function circuits such as a microprocessor are still powered. Then, when a main power is supplied to the television by a remote controller or a timer, an electrical power is supplied to a tuner, a voice and image processing portion, a CRT (cathode-ray tube) driving portion, etc., to output a television broadcasting. Therefore, in the standby mode, power consumption occurs continually unless a plug is completely separated from a plug-socket.

For example, if it is assumed that an electric power is 50 W (watts) in the operating mode and 2 W in the standby mode, an electric power of 4% is consumed in the standby mode. If it is assumed that a television set is operated for three hours, it is in standby mode for twenty one hours. Power consumption in the operating mode is 3 hours×50 Watts=150 Watt-hours, power consumption in the standby mode is 21 hours×2 Watts=42 Watt-hours. Power consumption is 192 Watt-hours a day. Therefore, power consumption in the standby mode is 22% of 192 Watt-hours, about a quarter (¼). An annual power consumption of one television set in the standby mode is as much as 15,330 Watt-hours.

In recent years, power saving electronic appliances have been strongly required for the purposes of saving resources. Therefore, manufacturers of electronic appliances such as TV (television) and VCR (video cassette recorder) undergo much research to reduce power consumption in the standby mode. There are various kinds of conventional techniques to reduce power consumption in the standby mode. The conventional technique includes a method in which an auxiliary low power terminal is added for a power saving in the standby mode, an output voltage drop method, an output terminal current open method, a switching frequency decreasing method (burst mode operation), etc. The conventional techniques have the following problems.

In the case of a method having an auxiliary low power terminal added, since the auxiliary power terminal should be added separately from the main power terminal, there is a problem that a production cost increases. Also, in case of the output voltage drop method, power saving efficiency and reliability are low. In the case of the output terminal current open method, since parts are added, the production cost increases and power saving efficiency is low. Lastly, in the case of the switching frequency decreasing method (burst mode operation), a turn-on loss decreases and an audible noise occurs.

In a power supply using the voltage drop method according to earlier art, since the power supply is designed centering on the operating mode having a high load capacity, power conversion efficiency in the standby mode is significantly lowered. Also, the switching control circuit has a function to lower an output voltage, but this merely reduces an output voltage at a second output of the transformer in order to reduce a load power. Therefore, the power supply according to the earlier art is low in power conversion efficiency and power saving efficiency.

Exemplars of the background art are U.S. Pat. No. 6,151,224 issued to Lim et al. for Power Supply with Reduced Power Comsumption in Standby Mode, U.S. Pat. No. 6,043,994 issued to Keller for Power Supply Having a Transformer for Standby Mode Operation, U.S. Pat. No. 5,126,930 issued to Ahn for Switched Mode Power Supply Controller Having a Stand-by State Using a Frequency Divided Burst Mode, U.S. Pat. No. 6,157,549 issued to Nath for Power Supply with Multiple Mode Operation, U.S. Pat. No. 5,351,177 issued to Megeid for Switch Mode Power Supply with Standby Mode Operation, U.S. Pat. No. 5,920,466 issued to Hirahara for Switching Power Supply Unit, U.S. Pat. No. 5,812,383 issued to Majid et al. for Low Power Stand-by for Switched-mode Power Supply Circuit with Burst Mode Operation, U.S. Pat. No. 5,041,964 issued to Cole et al. for Low-Power, Standby Mode Computer, U.S. Pat. No. 5,278,654 issued to Yang for TV Power Supply Control Method and Circuit with Automatic Standby Mode, and U.S. Pat. No. 5,375,247 issued to Hueser for Apparatus for Controlled Switching of a Microcomputer to Standby Mode.

SUMMARY OF THE INVENTION

It is therefore an object of the present invention to provide a power supply having a low power consumption and a high power saving efficiency.

It is another object to provide a power supply having production cost minimized while having power savings efficiency maximized.

It is still another object to power supply that is easy to manufacture and yet be highly efficient.

In order to achieve the above and other objects, the preferred embodiments of the present invention provide a power supply, including an operating power circuit outputting an operating voltage, a standby power circuit outputting a standby voltage, a starting switching circuit having a first remote control receiver for receiving a first remote control signal and supplying a starting power to the standby power circuit in response to the first remote control signal, a controller having a second remote control receiver for receiving a second remote control signal and performing a function corresponding to the second remote control signal, and a feedback circuit processing a control signal to switch the starting switching circuit to either of a standby mode and a power saving mode in response to a power offsignal from either of the second remote control receiver and a power switch.

The preferred embodiment of the present invention further provides a power supply, including an operating power circuit outputting an operating voltage, a standby power circuit outputting a standby voltage, a starting switching circuit having a remote control receiver for receiving first and second remote control signal and supplying a starting power to the standby power circuit in response to the first remote control signal, a controller performing a function corresponding to the second remote control signal, and a feedback circuit processing a control signal to switch the starting switching circuit to either of a standby mode and a power saving mode in response to a power off signal from either of the second remote control receiver and a power switch.

The power supply further includes a power input circuit supplying a first direct current voltage; a power transformer having a first winding, a second winding, a third winding and a fourth winding, the third winding connected to the operating power circuit, the fourth winding circuit connected to the standby power circuit; an auxiliary power circuit connected to the second winding of the power transformer and rectifying a voltage induced from the first winding to the second winding to a second direct current voltage; and a switching control circuit receiving the second direct current voltage of the auxiliary power circuit and switching a current flowing through the first winding of the power transformer into a high frequency current, where the high frequency current generate on the first winding of the power transformer is induced to both the third winding and the fourth winding of the power transformer.

The starting switching circuit further includes a switching unit having a starting resistor, a first resistor serially connected to the starting resistor, a first capacitor serially connected to the first resistor, a diode having one end serially connected to the first capacitor and the other end connected to one end of the first remote control receiver, and a zener diode having one end connected to the other end of the diode and one end of the first remote control receiver and the other end earthed (grounded); a starting power unit having a first transistor including an emitter electrode connected to the starting resistor, a collector electrode connected to the switching control circuit and a base electrode, a second transistor including an emitter electrode earthed, a collector electrode connected to the base electrode of the first transistor and a base electrode, a third resistor having one end connected to the other end of the first remote control receiver and the other end connected to the base electrode of the second transistor, a fourth resistor having one end earthed and the other end connected between the second transistor and the third resistor, and a second capacitor one end earthed and the other end connected between the second transistor and the third resistor.

The feedback circuit excessively increases a feedback current in response to the power off signal to reduce a switching on time of the switching control circuit, so that a voltage of the auxiliary power circuit falls down sufficiently to turn off the switching control circuit.

The preferred embodiment of the present invention further provides a method of reducing power consumption in a power supply having a standby mode, an operating mode and a power saving mode. The method includes receiving a power on signal from either of a first remote control receiver and a power switch in the standby mode; starting by supplying an initial starting voltage to switching control circuit when the power on signal is received; generating either of a standby voltage and an operating voltage by a switching operation of the switching control circuit; receiving a power off signal from either of a second remote control receiver and the power switch in the operating mode; and turning off the switching control circuit in response to the power off signal.

The method further includes checking whether the standby voltage is needed in response to the power off signal; and performing the power saving mode by turning off the switching control circuit when the standby voltage is not needed.

Using the power supply according to the preferred embodiments of the present invention, since only the start switching circuit having power consumption of several mWh (milliwatt-hours) is operated in the standby mode and other circuit portions is not powered, power consumption can be minimized in the power on remote control signal receiving standby state. Further, since the preferred embodiments of the present invention can constitute the power saving mode by adding several parts and the remote control receiver, the production cost can be minimized and the power saving efficiency can be maximized.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to preferred embodiments of the present invention, example of which is illustrated in the accompanying drawings.

Figure 1:
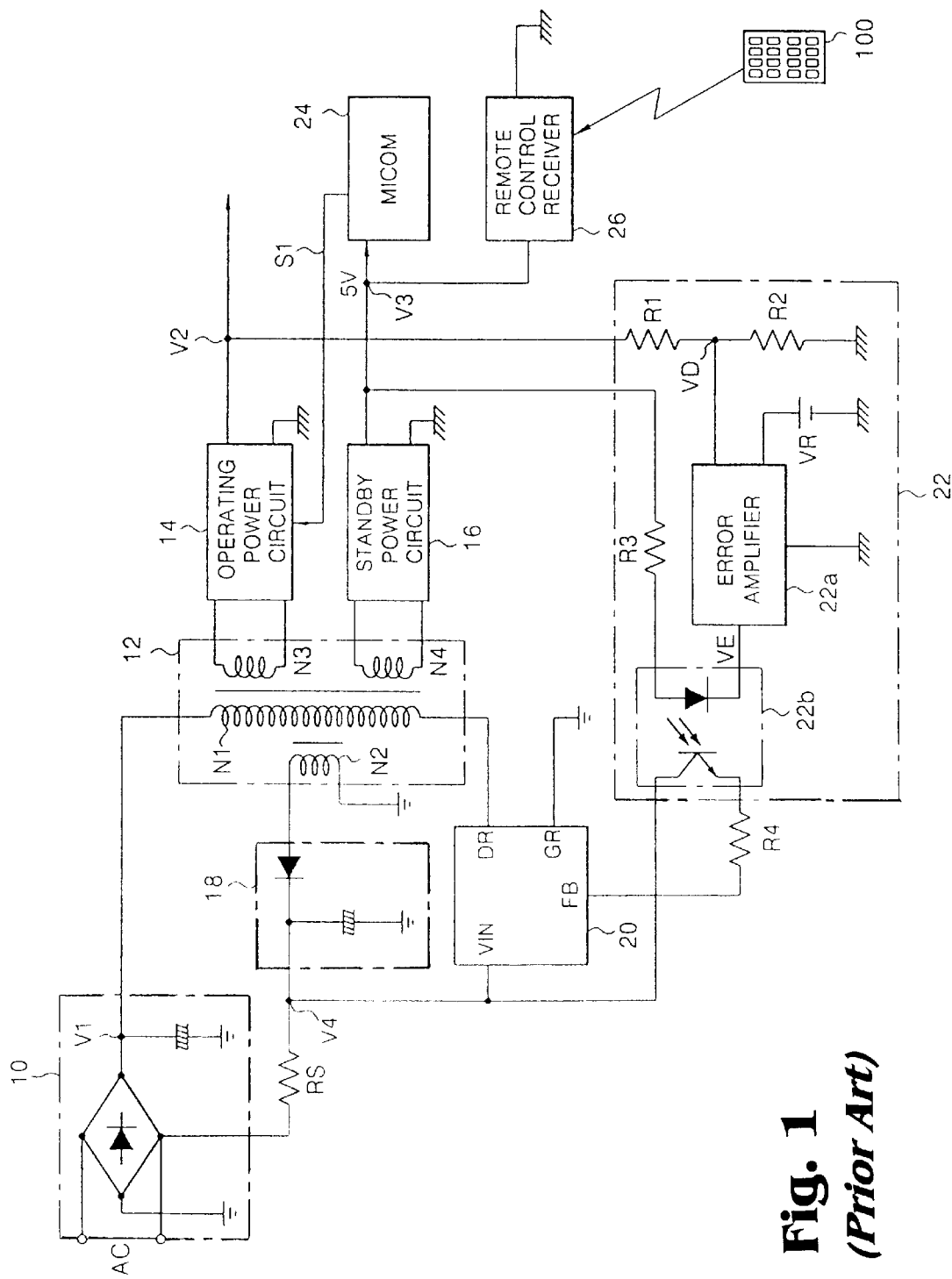
FIG. 1 is a circuit diagram illustrating a power supply according to an earlier art.

Turning now to the drawings, FIG. 1 is a circuit diagram illustrating a power supply using the output voltage drop method according to earlier art. The power supply includes an input power circuit 10, a power transformer 12, an operating power circuit 14, a standby power circuit 16, an auxiliary power circuit 18, a switching control circuit 20, a feedback circuit 22, a controller or microcomputer 24, and a remote control receiver 26.

When an alternating current (AC) voltage is applied, a starting voltage of a certain level is applied to a power input terminal VIN of the switching control circuit 20 through a starting resistor RS. The switching control circuit 20 is started to turn on or off a switching element that connects a driving terminal DR connected to a first winding N1 of the transformer 12 with a ground. A first direct current (DC) voltage signal V1 applied to the first winding N1 of the transformer 12 is induced to a second winding N2 by a turn-on or a turn-off of the switching element. Voltages induced to the second winding N2 are rectified in the auxiliary power circuit 18 so that a fourth DC voltage signal V4 is generated and is applied to the power input terminal VIN of the switching control circuit 20.

The switching control circuit 20 receives a stable operating voltage through the auxiliary power circuit 18 to switch a current that flows through the first winding N1 into a high frequency current. The high frequency current generated on the first winding N1 due to a high frequency switching operation is induced to the third and fourth windings N3 and N4. The high frequency current induced to the third winding N3 is converted into a direct current (DC) in the operating power signal circuit 14 so that a second direct current voltage signal V2 of tens to hundreds of volts is outputted as an operating voltage. The high frequency current induced to the fourth winding N4 is converted into a direct current in the standby power circuit 16, so that a third direct current voltage signal V3 of about 5 volt is outputted as a standby voltage.

The operating voltage V2 and the standby voltage V3 are all outputted in the operating mode. On the other hand, in the standby mode, the operating voltage is blocked, and only the standby voltage V3 is outputted to supply an electric power to the microcomputer 24 and the remote control receiver 26, thereby keeping the standby mode.

The feedback circuit 22 includes an error amplifier 22a, a photo coupler 22b, and resistors R1 to R3. The error amplifier 22a compares a detection voltage VD with a reference voltage VR to generate an error voltage VE. At this point, the detection voltage VD and the reference voltage VR are obtained by voltage-dividing the operating voltage by the resistors R1 and R2. The error voltage VE is supplied to a feedback signal input terminal FB of the switching control circuit 20 by the photo coupler 22b.

When the operating voltage V2 is greater than a predetermined voltage level, the detection voltage VD increases, and the error voltage VE is decreased, whereby increasing the feedback current increases. This makes the switching control circuit 20 decrease an on-time period of a switching signal to reduce the operating voltage V2.

When the operating voltage V2 is less than a predetermined voltage level, the detection voltage VD is decreased, and the error voltage VE increases, thereby reducing the feedback current. This makes the switching control circuit 20 increase an on-time period of a switching signal to increase the operating voltage V2. Therefore, the operating voltage V2 of more than a predetermined voltage level is sustained.

In the standby mode, the operating voltage V2 from the operating power circuit 14 is blocked in response to a control signal S1 from the microcomputer 24. Therefore, only the microcomputer 24 and the remote control receiver 26 are operated by the standby voltage V3 from the standby power circuit 16.

However, since the power supply described above is designed centering on the operating mode having a high load capacity, power conversion efficiency in the standby mode is significantly lowered. Also, the switching control circuit 20 has a function to lower an output voltage, but this merely reduces an output voltage at a second output of the transformer 12 in order to reduce a load power. Therefore, the power supply according to the conventional art is low in power conversion efficiency and power saving efficiency.

Figure 2:
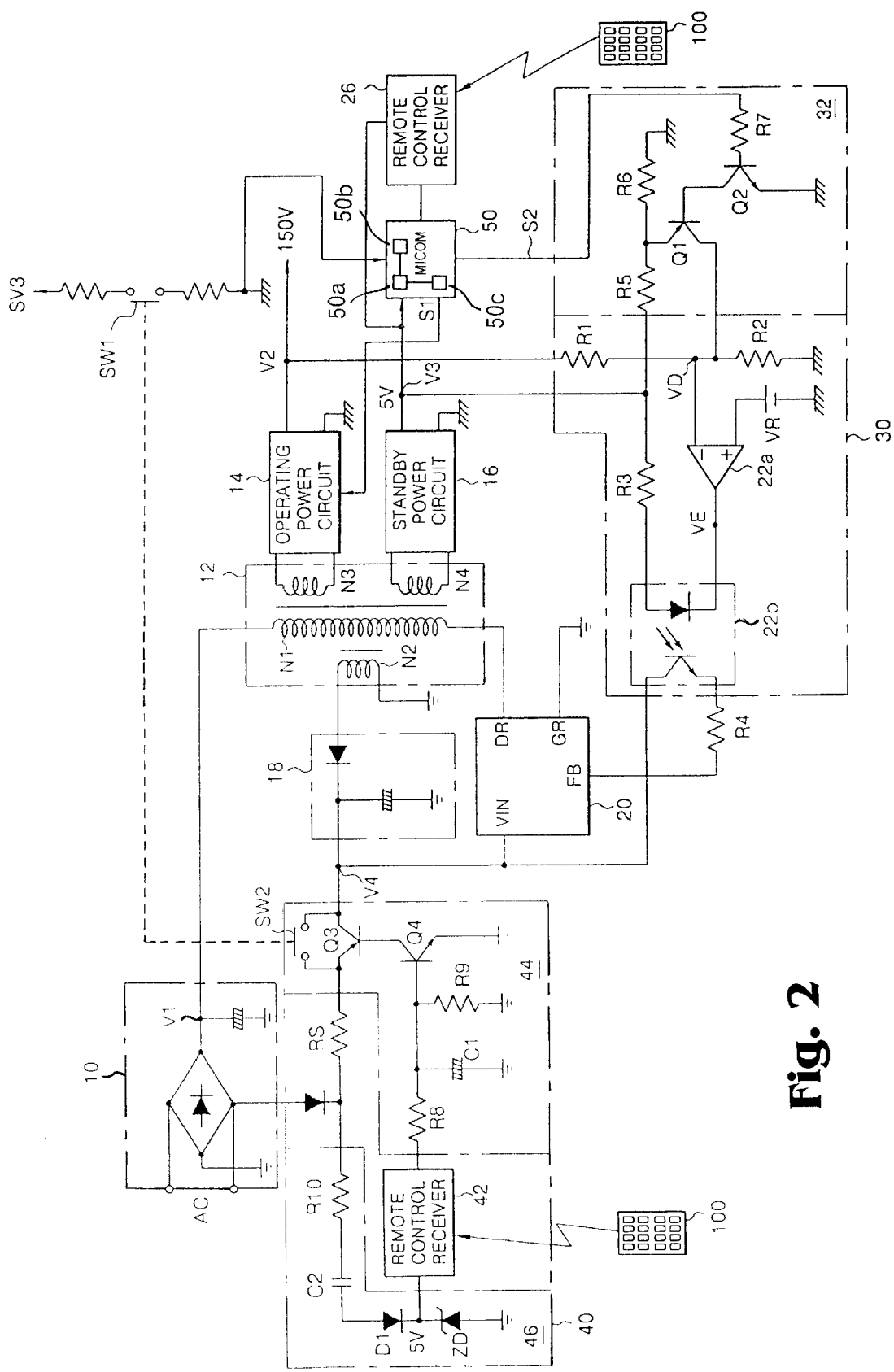
FIG. 2 is a circuit diagram illustrating a power supply according to a first preferred embodiment of the present invention.

FIG. 2 is a circuit diagram illustrating a power supply according to a first preferred embodiment of the present invention. The power supply according to the first preferred embodiment of the present invention employs the output voltage drop method. The power supply according to the preferred embodiment of the present invention includes an input power circuit 10, a power transformer 12, an operating power circuit 14, a standby power circuit 16, an auxiliary power circuit 18, a switching control circuit 20, a first remote control receiver 26, a feedback circuit 30, a starting switching circuit 40, and a microcomputer 50. As compared with FIG. 1, the feedback circuit 30 and the microcomputer 50 differ in configuration, and the starting switching circuit 40 is added. Like reference numerals denote like parts, and thus an explanation of the same components as those of FIG. 1 is omitted.

The feedback circuit 30 includes an error amplifier 22a, a photo coupler 22b, resistors R1 to R4, and a power off signal input circuit 32. The power off signal input circuit 32 includes transistors Q1 and Q2 and resistors R5 to R7. The transistor Q2 includes a base electrode for receiving a power off control signal S2 through the resistor R7, a collector electrode connected with a base electrode of the transistor Q1, and an emitter electrode earthed. The transistor Q1 includes an emitter electrode connected to a common connecting portion between the resistors R5 and R6, and a collector electrode connected to an inverted terminal "-" of the error amplifier 22a. The resistor R5 is connected with a third DC voltage signal V3, and the resistor R6 is earthed. When the power off control signal S2 goes to a logic "high" level, the transistors Q1 and Q2 are turned on, whereupon the power off signal input circuit 32 provides the inverted terminal "-" of the error amplifier 22a with a voltage divided by the resistors R5 and R6.

As a result, in the normal operating state, a detection voltage VD provided to the inverted terminal "-" of the error amplifier 22a greatly increases due to the power off signal having the logic "high" level, so that the error voltage VE that is an output voltage of the error amplifier 22a is greatly reduced. This excessively increases the feedback current that is inputted to the switching control circuit 20, so that the switching control circuit 20 greatly reduces a switching on time. Therefore, a voltage that is induced to the auxiliary power circuit 18 falls down greatly. Then, when a voltage level applied to an operating voltage input terminal VIN of the switching control circuit 20 falls down less than a predetermined level, the switching control circuit 20 is stopped. As a result, except for the starting switching circuit 40, an electric power supply to the rest circuits is blocked to go to a power saving mode. In other words, an electric power is not supplied to even the switching control circuit 20, the microcomputer 50 and the remote control receiver 26.

The starting switching circuit 40 includes a starting resistor RS, a second remote control receiver 42, a switching unit 44, and a starting power unit 46. The second remote control receiver 42 has the same configuration as the first remote control receiver 26 connected with the microcomputer 50 but outputs a pulse signal only when a power on signal is applied thereto. The switching unit 44 includes resistors R8 and R9, a capacitor C1, transistors Q3 and Q4, and a second power switch SW2. The transistor Q3 has an emitter electrode connected to the starting resistor RS, a collector electrode connected to the operating voltage input terminal VIN of the switching control circuit 20, and a base electrode connected to a collector electrode of the transistor Q4. The transistor Q4 has an emitter electrode earthed and a base electrode connected to the output terminal of the second remote receiver 42. Between the base electrode of the transistor Q4 and a ground, the resistor R9 and a capacitor C1 are parallel-connected. The collector electrode and the emitter electrode of the transistor Q3 are connected with the second power switch SW2. The power switch SW2 works together with a first power switch SW1. The starting power unit 46 includes a resistor R10, a capacitor C2, a diode D1, and a zener diode ZD. The starting power unit 46 receives an alternating current through the resistor R10 and the capacitor C2 and rectifies it through the diode D1 and provides a static voltage of 5 volt as the operating voltage to the second remote control receiver 42 through the zener diode ZD. The starting power unit 46 is connected with an alternating current through the capacitor C2 and supplies the operating voltage of the remote control receiver 42 periodically at intervals of a half wavelength of an alternating current signal, whereby a power consumption in the second remote control receiver 42 can be minimized. That is, the starting switching unit 40 periodically receives the operating voltage through the starting power unit 46. The second remote control receiver 42 receives a remote control signal indicating a power on and outputs a pulse signal in response to the remote control signal indicating a power on. The pulse signal is charged in the capacitor C1, and when the transistor Q4 is turned on, the transistor Q3 is turned on. Therefore, the starting current is supplied to the switching control circuit 20 through the starting resistor RS. Since the voltage that is charged in the capacitor C1 is discharged through the resistor R9, a turn-on time of the transistor Q4 may be established as a time constant of the resistor R9 and the capacitor C1 during a certain time period (e.g., several ms(milliseconds)) that the switching control circuit 20 is started. Therefore, after the switching control circuit 20 is started, since the transistor Q3 sustains the turn-off state, little power consumption due to the starting resistor RS occurs. Further, since an electric power is supplied to the auxiliary power circuit 18 through the starting resistor RS by a switching operation of the power switches SW1 and SW2, an initial start-up is possible.

When the first power switch SW1 is turned on in the state that the power supply is turned off, the microcomputer 50 performs a reset operation so that the power supply may be operated. When the power switch SW1 is turned on in the state that the power supply is turned on, the microcomputer 50 checks whether a function that requires a standby power, for example a timer function, is established or not. At this time, when the standby power is not needed, the microcomputer 50 supplies the power off control signal S2 to the error amplifier 22a. Alternatively, when the standby power is needed, the microcomputer 52 supplies the operating power off control signal S1 to turn off the operating power circuit 14.

Figure 3:
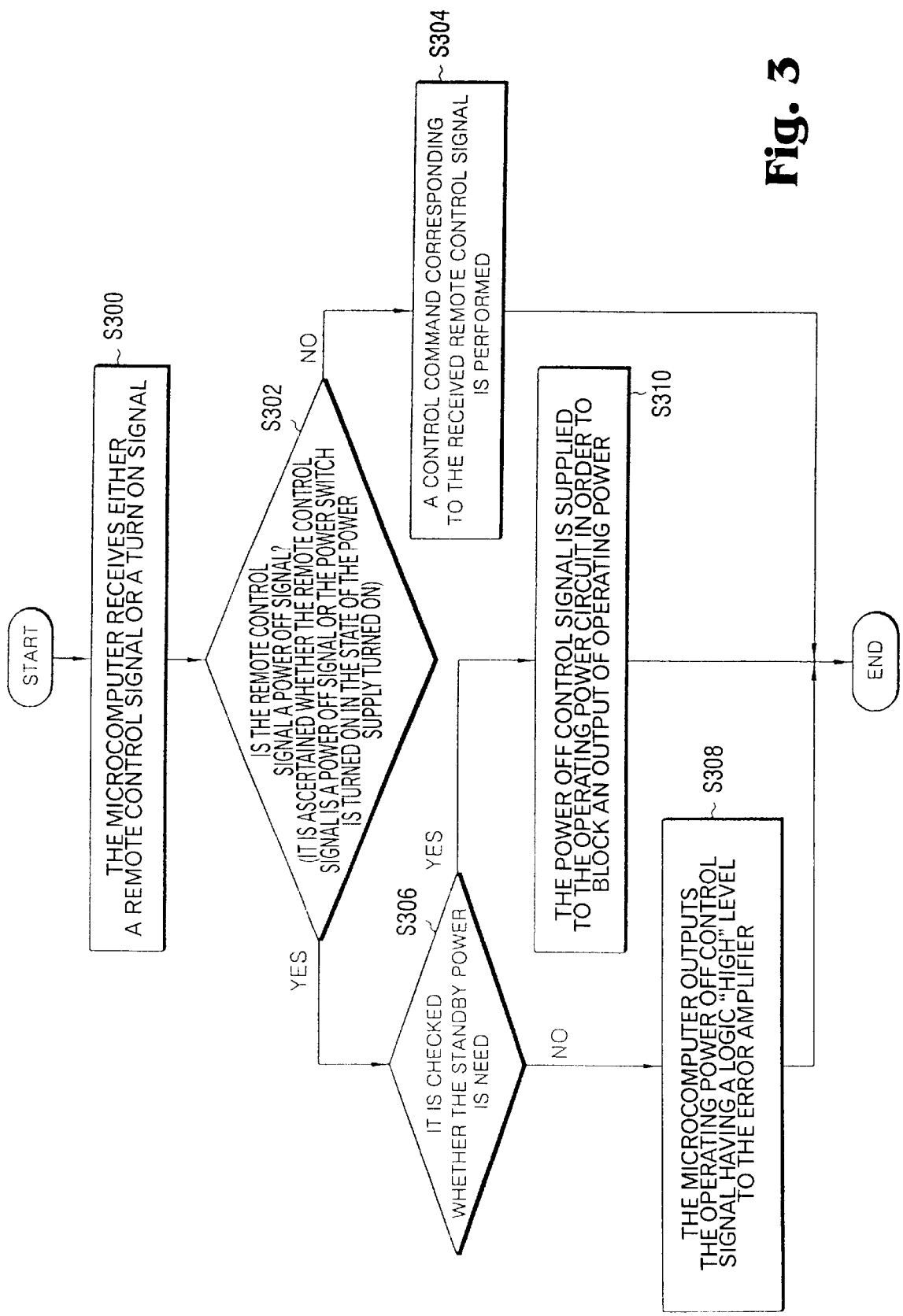
FIG. 3 is a flowchart illustrating a power off control function of the microcomputer of FIG. 2.

FIG. 3 is a flowchart illustrating a power off control function of the microcomputer of FIG. 2. The microcomputer 50 receives either remote control signals from the remote controller 100 through the first remote control receiver 26 or a turn on signal of the power switch SW1 (step S300). It is ascertained whether the remote control signal is a power off signal or the power switch SW1 is turned on in the state of the power supply turned on (step S302). In the step S302, when the remote control signal is not the power off signal, a control command corresponding to the received remote control signal is performed (step S304). Also, in the step S302, when the remote control signal is the power off signal, it is checked whether the standby power is need (step S306). For example, in case of a television set, when a turn on time of the television is set, in order to turn on the television at the set time, it is required to supply the standby power to the microcomputer 50. Thereafter, when the standby power is needed, the power off control signal S1 is supplied to the operating power circuit 14 in order to block an output of the operating power V2 (step S310). In other words, such an operation in a typical TV is performed by blocking a horizontal deflection drive pulse that is supplied to a base of a horizontal output transistor. Alternatively, when the standby power is not needed, the microcomputer 50 (microcomputer 50 includes a central processing unit 50a, a random access memory 50b, and a nonvolatile memory 50c) stores internal data in a nonvolatile memory 50c such as a flash memory and then outputs the operating power off control signal S2 having a logic "high" level to the error amplifier 22a (step S308).

In the first preferred embodiment of the present invention described above, an electric power is controlled by three modes: the operating mode; the standby mode; and the power saving mode. Since even the microcomputer and the switching control circuit are not powered in the power saving mode, power consumption in the starting switching circuit is merely several mWh (milliwatt hours).

Figure 4:
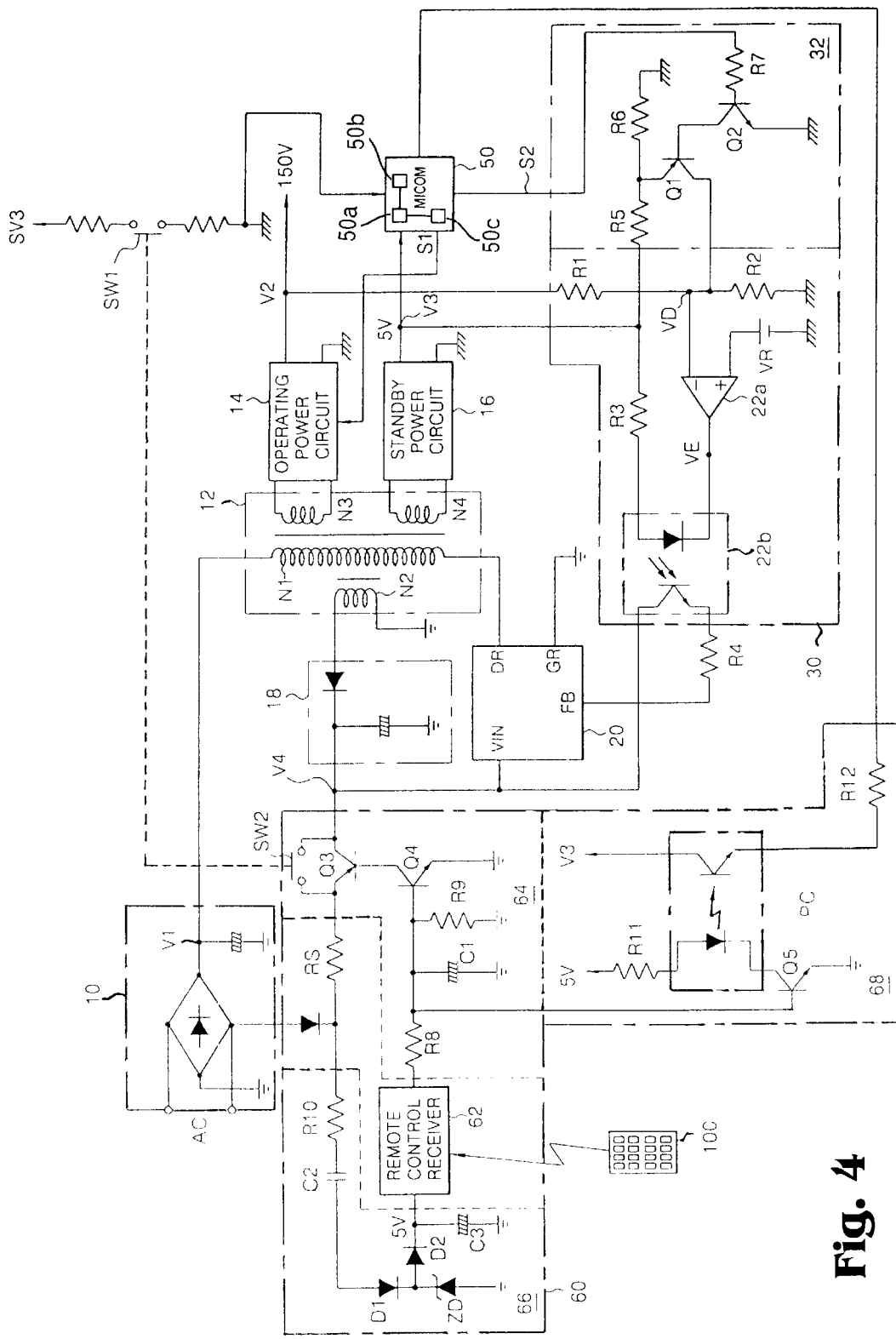
FIG. 4 is a circuit diagram illustrating a power supply according to a second preferred embodiment of the present invention.

FIG. 4 is a circuit diagram illustrating a power supply according to a second preferred embodiment of the present invention. The second preferred embodiment of the present invention employs just one remote control receiver, while the first embodiment of the present invention employs two remote control receivers. That is, the first remote control receiver 26 connected to the microcomputer 50 is removed in the second preferred embodiment of the present invention.

As shown in FIG. 4, the start switching circuit 60 includes the starting resistor RS, the third remote control receiver 62, the switching unit 64, the starting power unit 66, and the remote control signal transmitting portion 68. The third remote control receiver 62 has the same configuration as the first remote control receiver 26 connected to the microcomputer 50 of FIG. 2. In other words, the third remote control receiver 62 generates all of the remote control signals established as well as the power on remote control signal.

The switching unit 64 has the same configuration as that of the first preferred embodiment of the present invention of FIG. 2.

The starting power unit 66 includes the resistor R10, a capacitor C2, the zener diode ZD, a diode D2, and a capacitor C3. The starting power unit 66 receives an alternating current through the resistor R10 and the capacitor C2, and clamps a voltage through the zener diode ZD. At this point, the capacitor C2 drops an alternating current voltage, and the resistor R10 limits an abnormal current. A voltage of about 5.6 volt obtained through the zener diode ZD is rectified through the diode D2, and a rectified voltage is smoothened through the smoothing capacitor C3 to generate a starting voltage of about 5 volt as the operating voltage of the remote control receiver 62.

The remote control signal transmitting portion 68 includes resistors R11 and R12, a transistor Q4 and a photo coupler PC. The transistor Q4 has a collector electrode connected to the operating voltage of 5 volt through an emitting portion of the photo coupler PC and a resistor R11, an emitter electrode earthed, and a base electrode connected to an output terminal of the remote control receiver 62 through the resistor R8. The photo coupler PC has one end, i.e., a light receiving portion, connected to the standby power voltage V3 and the other end connected to a remote control signal input terminal of the microcomputer 50 through the resistor R3. The photo coupler PC serves as an isolation to block an electrical impact between a first portion of the power transformer (i.e., a hot power portion) and a second portion of the power transformer (i.e., a cold power portion).

Therefore, due to the power on remote control signal, the power supply according to the second preferred embodiment of the present invention performs the same operation as that according to the first preferred embodiment of the present invention. Other remote control signals are transferred to the microcomputer 50 through the remote control signal transmitting portion 68.

As described herein before, using the power supply according to the preferred embodiments of the present invention, since only the start switching circuit having power consumption of several mWh (milliwatt-hours) is operated in the standby mode and other circuit portions are not powered, power consumption can be minimized in the power on remote control signal receiving standby state. Further, since the preferred embodiments of the present invention can constitute the power saving mode by adding several parts and the remote control receiver, the production cost can be minimized and the power saving efficiency can be maximized.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A power supply, comprising:
    an operating power circuit outputting an operating voltage;
    a standby power circuit outputting a standby voltage;
    a starting switching circuit having a first remote control receiver for receiving a first remote control signal and supplying a starting power to the standby power circuit in response to the first remote control signal;
    a controller having a second remote control receiver for receiving a second remote control signal and performing a function corresponding to the second remote control signal; and
    a feedback circuit processing a control signal to switch the starting switching circuit to either of a standby mode and a power saving mode in response to a power off signal from either of the second remote control receiver and a power switch.

2. The power supply of claim 1, further comprising:
    a power input circuit supplying a first direct current voltage;
    a power transformer having a first winding, a second winding, a third winding and a fourth winding, the third winding connected to the operating power circuit, the fourth winding circuit connected to the standby power circuit;
    an auxiliary power circuit connected to the second winding of the power transformer and rectifying a voltage induced from the first winding to the second winding to a second direct current voltage; and
    a switching control circuit receiving the second direct current voltage of the auxiliary power circuit and switching a current flowing through the first winding of the power transformer into a high frequency current,
    wherein the high frequency current generated on the first winding of the power transformer is induced to both the third winding and the fourth winding of the power transformer.

3. The power supply of claim 1, with the starting switching circuit further comprising:
    a switching unit including a starting resistor, a first resistor serially connected to the starting resistor, a first capacitor serially connected to the first resistor, a diode having one end serially connected to the first capacitor and the other end connected to one end of the first remote control receiver, and a zener diode having one end connected to the other end of the diode and one end of the first remote control receiver and the other end grounded; and
    a starting power unit having a first transistor including an emitter electrode connected to the starting resistor, a collector electrode connected to the switching control circuit and a base electrode, a second transistor including an emitter electrode grounded, a collector electrode connected to the base electrode of the first transistor and a base electrode, a third resistor having one end connected to the other end of the first remote control receiver and the other end connected to the base electrode of the second transistor, a fourth resistor having one end grounded and the other end connected between the second transistor and the third resistor, and a second capacitor one end grounded and the other end connected between the second transistor and the third resistor.

4. The power supply of claim 1, with the starting switching circuit further comprising:
    a switching unit including a starting resistor, a first resistor serially connected to the starting resistor, a first capacitor serially connected to the first resistor, a diode having one end serially connected to the first capacitor and the other end connected to one end of the first remote control receiver, and a zener diode having one end connected to the other end of the diode and one end of the first remote control receiver and the other end grounded; and
    a starting power unit having a first transistor including a first electrode of a principal electrically conducting channel, a second electrode of said principal electrically conducting channel, and a control electrode, the control electrode regulating a current flow between said first electrode and the second electrode of the principal electrically conducting channel, the first transistor including the first electrode connected to the starting resistor, the second electrode connected to the switching control circuit and the control electrode, a second transistor a transistor including a first electrode of a principal electrically conducting channel, a second electrode of said principal electrically conducting channel, and a control electrode, the control electrode regulating a current flow between the first electrode and the second electrode of the principal electrically conducting channel, the second transistor including the first electrode grounded, the second electrode connected to the control electrode of the first transistor and the control electrode of the second transistor, a third resistor having one end connected to the other end of the first remote control receiver and the other end connected to the control electrode of the second transistor, a fourth resistor having one end grounded and the other end connected between the second transistor and the third resistor, and a second capacitor one end grounded and the other end connected between the second transistor and the third resistor.

5. The power supply of claim 2, further comprised of the feedback circuit excessively increasing a feedback current in response to the power off signal to reduce a switching on time of the switching control circuit, to accommodate a voltage of the auxiliary power circuit to fall down sufficiently to turn off the switching control circuit.

6. A power supply, comprising:
    an operating power circuit outputting an operating voltage;

a standby power circuit outputting a standby voltage;

a starting switching circuit including a remote control receiver for receiving first and second remote control signal and supplying a starting power to the standby power circuit in response to the first remote control signal;

a controller performing a function corresponding to the second remote control signal; and a feedback circuit processing a control signal to switch the starting switching circuit to either of a standby mode and a power saving mode in response to a power off signal from either of the second remote control receiver and a power switch.

7. The power supply of claim 6, further comprising a remote control transmitting portion transferring the second remote control signal to the controller.

8. The power supply of claim 6, further comprising:

a power input circuit supplying a first direct current voltage;

a power transformer having a first winding, a second winding, a third winding and a fourth winding, the third winding connected to the operating power circuit, the fourth winding circuit connected to the standby power circuit;

an auxiliary power circuit connected to the second winding of the power transformer and rectifying a voltage induced from the first winding to the second winding to a second direct current voltage; and a switching control circuit receiving the second direct current voltage of the auxiliary power circuit and switching a current flowing through the first winding of the power transformer into a high frequency current, wherein the high frequency current generate on the first winding of the power transformer is induced to both the third winding and the fourth winding of the power transformer.

9. The power supply of claim 8, further comprised of the feedback circuit increasing a feedback current in response to the power off signal to reduce a switching on time of the switching control circuit, to accommodate a voltage of the auxiliary power circuit to fall down sufficiently to turn off the switching control circuit.

10. A method of reducing power consumption in a power supply having a standby mode, an operating mode and a power saving mode, the method, comprising:

receiving a power on signal from either of a first remote control receiver and a power switch in the standby mode;

starting by supplying an initial starting voltage to a switching control circuit when the power on signal is received;

generating either of a standby voltage and an operating voltage by a switching operation of the switching control circuit;

receiving a power off signal from either of a second remote control receiver and the power switch in the operating mode; and turning off the switching control circuit in response to the power off signal.

11. The method of claim 10, further comprising, checking whether the standby voltage is needed in response to the power off signal; and performing the power saving mode by turning off the switching control circuit when the standby voltage is not needed.

12. A power supply, comprising:

a starting switching circuit having a first remote control receiver for receiving a first remote control signal and supplying a starting power to a standby power circuit for outputting a standby voltage in response to the first remote control signal;

a controller receiving a turn on signal;

a switching control circuit receiving a direct current voltage of an auxiliary power circuit and switching a current flowing through a first winding of a power transformer into a high frequency current; and a feedback circuit processing a control signal from the controller to switch the starting switching circuit to either of a standby mode and a power saving mode in response to a power off signal from either of the second remote control receiver and a power switch, wherein except for the starting switching circuit, an electric power supply is blocked from the switching control circuit, the microcomputer and the first remote control receiver when in the standby mode.

13. The power supply of claim 12, further comprising a second remote control receiver coupled with the controller, the controller receiving a second remote control signal from the second remote control receiver and performing a function corresponding to the second remote control signal.

14. The power supply of claim 12, further comprising a remote control signal transmitting portion transferring the first remote control signal to the controller.

* * * * *